(12) United States Patent
Biewer et al.

(10) Patent No.: US 10,350,979 B2
(45) Date of Patent: Jul. 16, 2019

(54) SLIDING ROOF SYSTEM

(71) Applicant: Roof Systems Germany GmbH, Dietzenbach (DE)

(72) Inventors: Christian Biewer, Muenster (DE); Heiko Albert, Rodgau (DE); Stefan Kunkel, Aschaffenburg (DE)

(73) Assignee: ROOF SYSTEMS GERMANY GMBH, Dietzenbach (DE)

( * ) Notice: Subject to any disclaimer, the term of this patent is extended or adjusted under 35 U.S.C. 154(b) by 0 days.

(21) Appl. No.: 15/782,364

(22) Filed: Oct. 12, 2017

(65) Prior Publication Data
US 2018/0099547 A1 Apr. 12, 2018

(30) Foreign Application Priority Data
Oct. 12, 2016 (DE) .................. 10 2016 119 450

(51) Int. Cl.
*B60J 7/02* (2006.01)
*B60J 7/043* (2006.01)

(52) U.S. Cl.
CPC ............. *B60J 7/024* (2013.01); *B60J 7/043* (2013.01); *B60J 7/0435* (2013.01)

(58) Field of Classification Search
CPC .......... B60J 7/024; B60J 7/043; B60J 7/0435
USPC .................. 296/216.02–216.05, 220.01
See application file for complete search history.

(56) References Cited

U.S. PATENT DOCUMENTS

| | | | | |
|---|---|---|---|---|
| 4,877,285 A * | 10/1989 | Huyer | .................. | B60J 7/0435 296/216.03 |
| 9,776,486 B2 * | 10/2017 | Wingen | .................. | B60J 7/024 |
| 9,834,075 B2 * | 12/2017 | Heidan | .................. | B60J 7/0435 |
| 9,975,409 B2 * | 5/2018 | Holzel | .................. | B60J 7/024 |
| 2015/0048655 A1 | 2/2015 | Heidan et al. | | |
| 2015/0306942 A1 * | 10/2015 | Heidan | .................. | B60J 7/024 296/216.02 |

FOREIGN PATENT DOCUMENTS

| | | |
|---|---|---|
| DE | 102010034566 A1 | 2/2012 |
| DE | 102011013826 A1 | 9/2012 |
| DE | 102011015833 A1 | 10/2012 |
| DE | 102013216292 A1 | 2/2015 |
| DE | 102014110234 A1 | 11/2015 |
| DE | 102015201587 A1 | 8/2016 |

OTHER PUBLICATIONS

English Machine Translation to DE102010034566 Abstract.
English Machine Translation to DE102011013826 Abstract.
English Machine Translation to DE102011015833 Abstract.
English Machine Translation to DE102013216292 Abstract.
English Maching Translation to DE102014110234 Abstract.
English Maching Translation to DE102015201587 Abstract.
German Search Report Application 10 2016 119 450.6.

* cited by examiner

*Primary Examiner* — Dennis H Pedder
(74) *Attorney, Agent, or Firm* — Dilworth IP, LLC

(57) ABSTRACT

A motor vehicle sliding roof system for shifting a cover from a closed position to an open position has at least one guide rail, a carriage that is displaceable in the guide rail, a lifting mechanism that controls a displacement of the front edge of the cover, a raising mechanism that controls a displacement of the rear edge of the cover, and a transfer mechanism adapted to transfer a displacement of the carriage to the raising mechanism. The lifting mechanism, the raising mechanism and the transfer mechanism have a modular structure.

22 Claims, 18 Drawing Sheets

SLIDING ROOF SYSTEM

CROSS REFERENCE TO RELATED APPLICATIONS

This application claims foreign priority to the following German Patent Application, DE 10 2016 119 450.6 filed on Oct. 12, 2016, under 35 U.S.C. § 119, the contents of which are incorporated herein by reference thereto.

The invention relates to a motor vehicle sliding roof system for shifting a cover from a closed position to an open position.

BACKGROUND OF THE INVENTION

Sliding roof systems are known which have at least one guide rail, a carriage that is displaceable in the guide rail, a lifting mechanism that controls a displacement of the front edge of the cover, a raising mechanism that controls a displacement of the rear edge of the cover, and a transfer mechanism adapted to transfer a displacement of the carriage to the raising mechanism.

In its closed position, the cover of the sliding roof system seals an opening in the vehicle roof. In a simple example, the opening is rectangular and is provided in a roof skin made of sheet metal or a plastic material. Commonly used sliding roof systems allow the cover to be first raised outward at its rear edge, so that a so-called venting position is reached. In a further step, the front edge of the cover can then also be raised outward, so that when the cover has been lifted altogether, it is moved rearward and thereby exposes the opening to a greater or lesser extent.

As far as terms such as "front", "rear", "top", "bottom" or "outside" are used here, they relate to the usual installation conditions of the sliding roof system in a motor vehicle which is in its usual operating position. The term "outside" refers to the perspective of a vehicle occupant.

The known sliding roof systems have various drawbacks. For one thing, the lifting mechanism restricts the headroom. This is critical in particular with regard to the head impact requirements, which are used to assess the loads possibly acting on the head of a vehicle occupant in the event of an accident. Also, in known sliding roof systems, detent elements are employed on various occasions, causing disturbing noises in the necessary final and intermediate positions. Furthermore, it is not possible in the systems employed today to adjust the cover relative to the mechanism in its overall width. These constraints frequently lead to tensions or distortion of the mechanism of the sliding roof system, which then results in reduced ease of movement. A further reason for the sliding roof system not moving smoothly when the cover is shifted may reside in that the system is overdetermined and/or unfavorable pairings of materials of the gliding system are used. Nowadays, the selection of surface materials that can be used for the guide rail is determined primarily by the manufacturing methods employed for producing the cover (in particular a glass cover). It has also been found that the known sliding roof systems each require a vehicle-specific adaptation to different curvatures and dimensions of the vehicle roof.

It is the object of the invention to provide a sliding roof system eliminating at least some of these drawbacks.

BRIEF DESCRIPTION OF THE INVENTION

To achieve this object, in a sliding roof of the type mentioned at the outset, provision is made according to the invention that the lifting mechanism, the raising mechanism and the transfer mechanism have a modular structure. "Modular structure" here means that there are interfaces between the lifting mechanism, the raising mechanism and the transfer mechanism that allow these three mechanisms to be coupled to each other in a standardized fashion even if at least one of the mechanisms has been modified in a manner specific to the vehicle type. This allows the sliding roof system to be used always with the same basic design and only those modules to be adapted which definitely have to be changed in view of the transfer of the sliding roof system to a new vehicle type. For example, an adaptation to a change in dimensions in the longitudinal direction may be performed in that the transfer mechanism is realized to be longer or shorter. The appropriately modified transfer mechanism is then coupled to the lifting mechanism, which has been left basically unchanged, and to the raising mechanism.

Preferably, provision is made that the carriage is coupled to the lifting mechanism. This allows to convert, directly and in a well-tried manner, a shifting movement of the carriage as caused, for example, by a drive system into a lifting movement of the front edge of the cover.

Preferably, the lifting mechanism includes a lifting lever having one end cooperating with the carriage and the other end of which is associated with the cover. Using a lifting lever, the lifting movement of the cover can be achieved with very little friction.

The lifting lever preferably is mounted to swivel about a swivel axis which is arranged between its two ends. This allows a very flexible use of the lifting lever as a transmission lever.

A large lifting height of the cover at its front edge can be obtained in that the distance of the end of the lifting lever cooperating with the carriage from the swivel axis is on the order of from 20% to 60% of the distance between the swivel axis of the lifting lever and a connecting point of the cover.

The swivel axis of the lifting lever may be associated with a support part which is arranged for displacement in the guide rail. This allows the lifting lever to be moved rearward together with the cover without any difficulty when the cover is opened.

Preferably, the lifting lever is provided with a control pin which cooperates with a control slot arranged in the guide rail. The control slot, together with the control pin, allows the shifting of the lifting lever in the longitudinal direction to be controlled with little effort.

Preferably, the control slot, as viewed from the front to the rear, includes a section sloping downward and, adjacent thereto, a section open to the rear, which is adjoined by a guide track extending in a straight line along the guide rail. In this configuration, when the control lever has shifted the front end of the cover fully outwards, it will exit the control slot and can then be shifted rearward completely freely in the guide track and thus in the guide rail.

According to a preferred embodiment of the invention, provision is made that the lifting mechanism extends exclusively above the lower edge of the guide rail. This provides a large headroom, which results in low loads in the event of a head impact.

The raising mechanism preferably includes a raising lever which is swivel-mounted to a bearing block. Using a swiveling raising lever, the raising movement of the cover can be achieved with very little friction.

Preferably, provision is made that at its free end the raising lever is provided with a slide guide for a cover holder. The slide guide allows the raising lever to be fixedly mounted on the guide rail in the longitudinal direction, so that a structure is obtained that is simple in design. When the cover is opened, it is then shifted together with its cover holder relative to the raising lever.

The raising movement of the raising lever may be obtained with little effort in that in its middle portion, the raising lever is provided with a transfer slot into which a transfer element of the transfer mechanism engages.

Preferably, it is provided that the raising lever runs in a curved shape. This allows a very small overall height of the raising mechanism in the closed state to be achieved.

With regard to a precise guiding of the transfer element relative to the raising lever, provision is made that the bearing block includes a guide for the transfer element. In addition, this results in a high load-bearing capacity in case of forces that act outwards in the z-direction.

According to one configuration of the invention, provision is made that the swivel axis by means of which the raising lever is connected with the bearing block is arranged below the lower edge of the guide rail. As a result of this, the raising lever can be realized with a length necessary to generate the desired raising stroke.

According to one configuration of the invention, provision is made that the transfer element is a transfer rod. In this way, the tensile and compressive forces that are necessary to drive the raising mechanism can be transferred without any further effort and without any complicated design being required.

The transfer element preferably is releasably coupled to the carriage, so that the carriage can be freely shifted when the transfer element has actuated the raising mechanism.

To be able to control the position of the transfer element with little effort, the guide rail preferably has a coupling slot arranged therein, into which the transfer element engages.

The coupling slot may include a shift section extending in a straight line from the front to the rear and, adjacent thereto, a locking section extending downward. A special feature of this coupling slot is that at no point in time is the transfer element separated from the coupling slot. As a result, the noises are avoided which are produced in other sliding roof systems when the transfer mechanism is released from the key and locked in the guide rail.

Preferably, the carriage includes a retaining lug which engages on the upper side of the transfer element when the latter is uncoupled from the carriage. In this way, the transfer element is reliably held at the lower end of the locking section. Alternatively or additionally, a sliding element may also be provided which retains the end of the transfer element associated with the carriage when the end is uncoupled from the carriage. This ensures that the front end of the transfer element reliably remains at the lower end of the coupling slot after it has been put down there.

The carriage preferably includes a control slot, which is open at the front side of the carriage. The carriage can thus be released from the transfer element with little effort.

Preferably, the control slot includes an insertion section extending rearward at the bottom and, adjacent thereto, a lifting section extending upward. Using this control slot, in cooperation with the coupling slot the transfer element can be coupled to, and released from, the carriage with very little effort.

Preferably, it is provided that the coupling slot and the control slot are formed in a plastic part which is inserted in the guide rail. This reduces the production expenditure since an extruded profile, for example, can be used for the guide rail, that is, a part the shape and cross-section of which do not change along the guide rail. More complex shapes such as the coupling slot and the control slot, on the other hand, are realized by means of a separate component which is inserted in the guide rail at the desired point, for example is inserted into the end open at the front.

BRIEF DESCRIPTION OF THE DRAWINGS

The invention will be described below with reference to various embodiments which are illustrated in the accompanying drawings, in which.

DETAILED DESCRIPTION OF THE INVENTION

Figure 1:
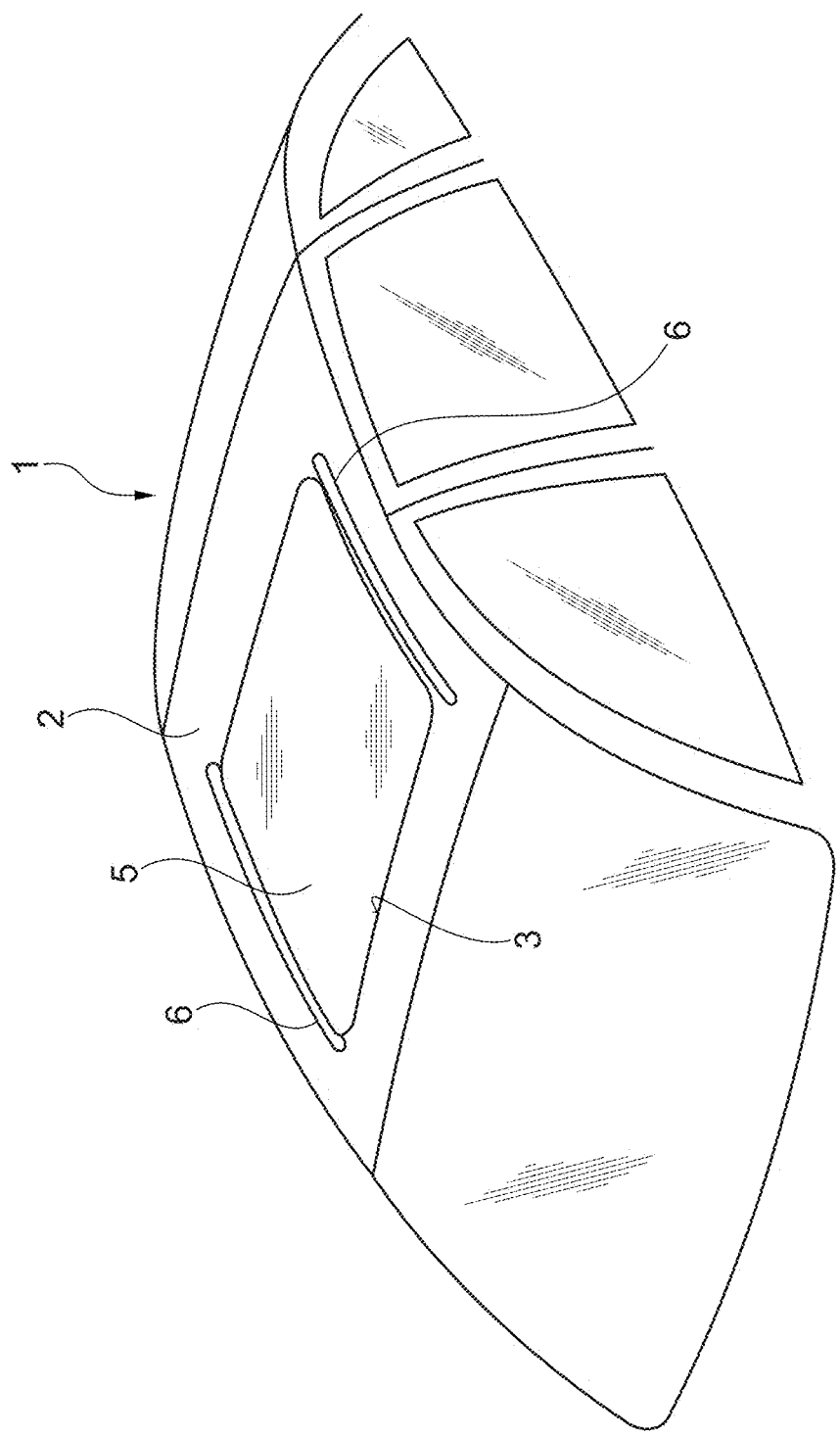
FIG. 1 schematically shows a vehicle roof with a sliding roof system fitted thereto.
Figure 2:
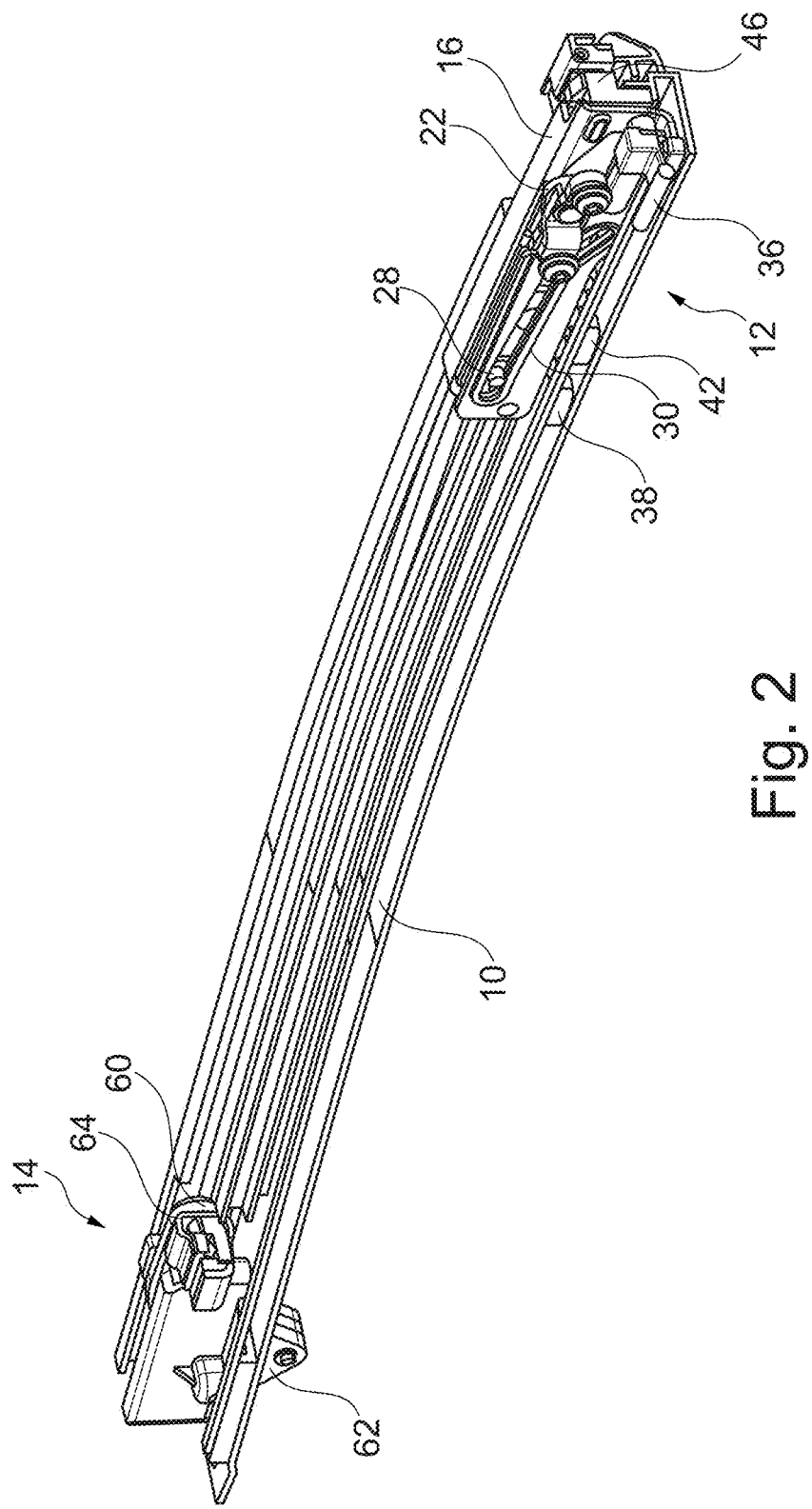
FIG. 2 shows, in a perspective view, the mechanism on one side of the sliding roof system, with the cover holder not being shown and the mechanism being in the closed position.
Figure 3:
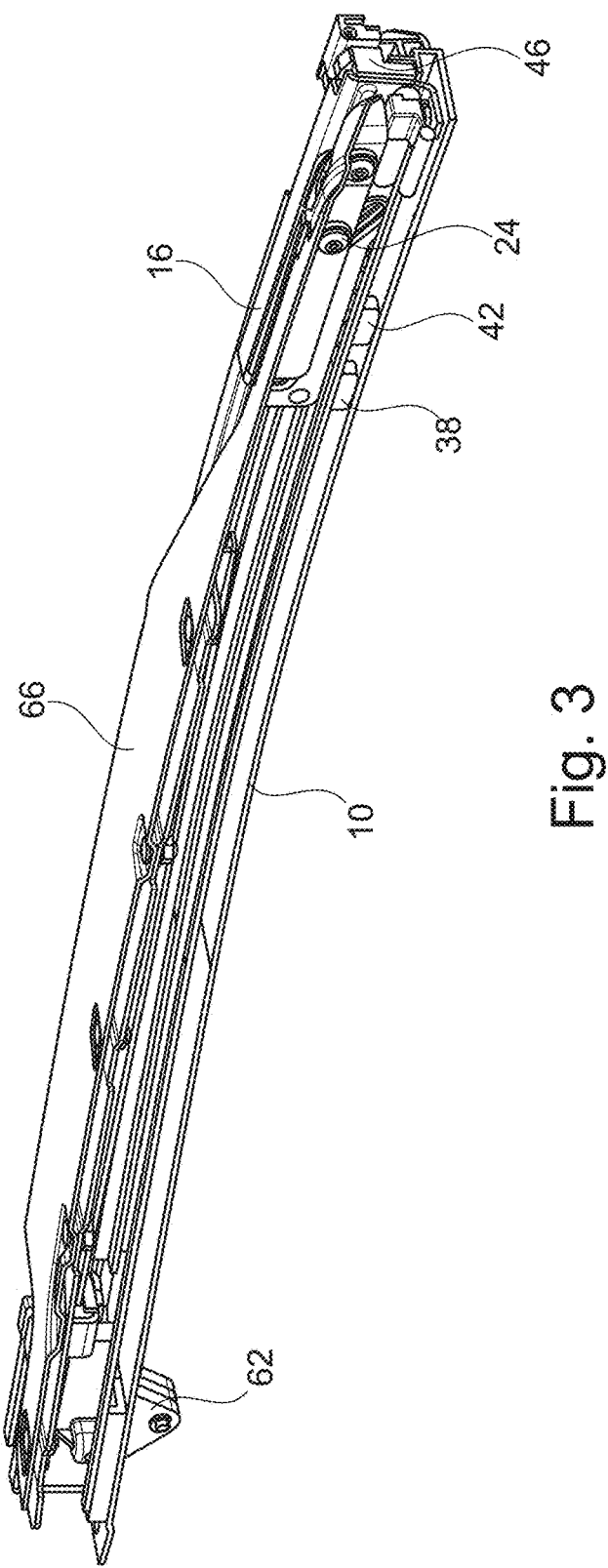
FIG. 3 shows a view corresponding to that of FIG. 2, with the cover holder being indicated.
Figure 4:
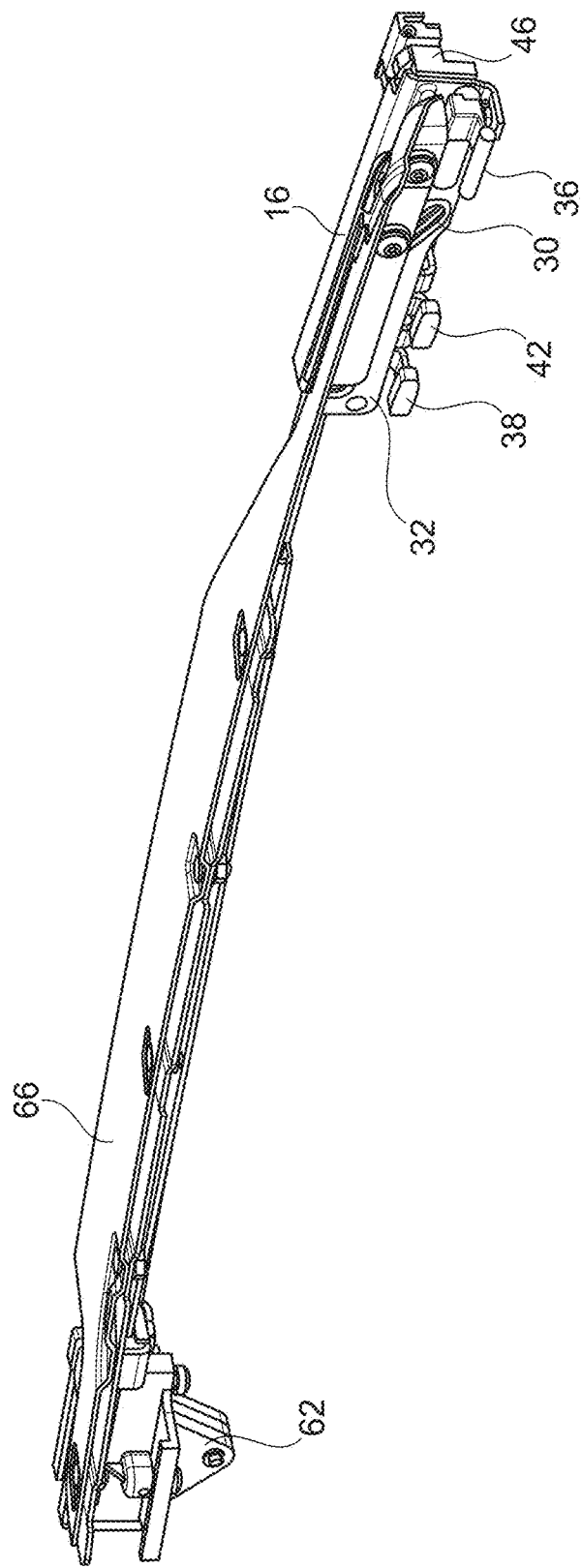
FIG. 4 shows a view corresponding to that of FIG. 3, with the guide rail not being illustrated.

FIG. 1 schematically shows the upper half of a motor vehicle 1. It has a vehicle roof 2 in which an opening 3 is provided which has a cover 5 associated therewith.

The cover 5 may consist of sheet metal, of a transparent or dyed plastic material, or of glass.

The cover 5 is part of a sliding roof system, the mechanism of which is indicated by the reference number 6 here. The sliding roof mechanism can be used to raise the cover 5 outward and to shift it rearward, starting from the closed position shown in FIG. 1.

With reference to FIGS. 3 to 7, the structure of the mechanism of the sliding roof system will be discussed below. Only one side of the mechanism 6 will be described here; the same mechanism is located as a mirror image on the other side of the roof opening 3.

The mechanism of the sliding roof system includes a guide rail 10 which extends along one of the edges of the roof opening 3 substantially parallel to the longitudinal direction of the motor vehicle 1. The guide rail 10 may be a profiled part made of an aluminum alloy, for example. A material that can be used as an alternative is a plastic material.

The guide rails usually have a curved shape, so that they follow the roof curvature of the vehicle roof 2.

For shifting the cover 5, the mechanism of the sliding roof system includes a lifting mechanism 12 which is associated with the front edge of the cover 5, a raising mechanism 14 which is associated with the rear edge of the cover, and a carriage 16 which serves to control the mechanism.

Furthermore, a transfer mechanism 18 is provided, which serves to drive the raising mechanism 14.

The lifting mechanism 12, the transfer mechanism 18 and the raising mechanism 14 are constructed as modules, so that they can be coupled to each other in a simple manner, even if one of the mechanisms has been modified in a manner specific to the vehicle type. For example, the length of the transfer mechanism can be modified without the connection to the lifting and raising mechanisms being affected thereby. Also, the lifting mechanism can be modified as regards the lifting height etc. without the connection to the transfer mechanism being affected thereby. The same applies to the connection between the transfer mechanism and the raising mechanism.

The lifting mechanism 12 includes a lifting lever 20 as an essential component, which at its front end 22 is associated with the cover 5. For this purpose, a fastening part 24 to which the cover or a cover holder can be fitted is swivel-mounted here at the front end 22 of the lifting lever 20.

The other, rear, end 26 of the lifting lever 20 is provided with a pin 28 which engages into a lifting slot 30 which is associated with the carriage 16.

In the exemplary embodiment shown, the lifting slot 30 is installed in a side plate 32 which is connected via spacers 34 to the carriage 16 proper. The lifting lever 20 is therefore guided between the carriage 16 and the side plate 32.

Figure 5:
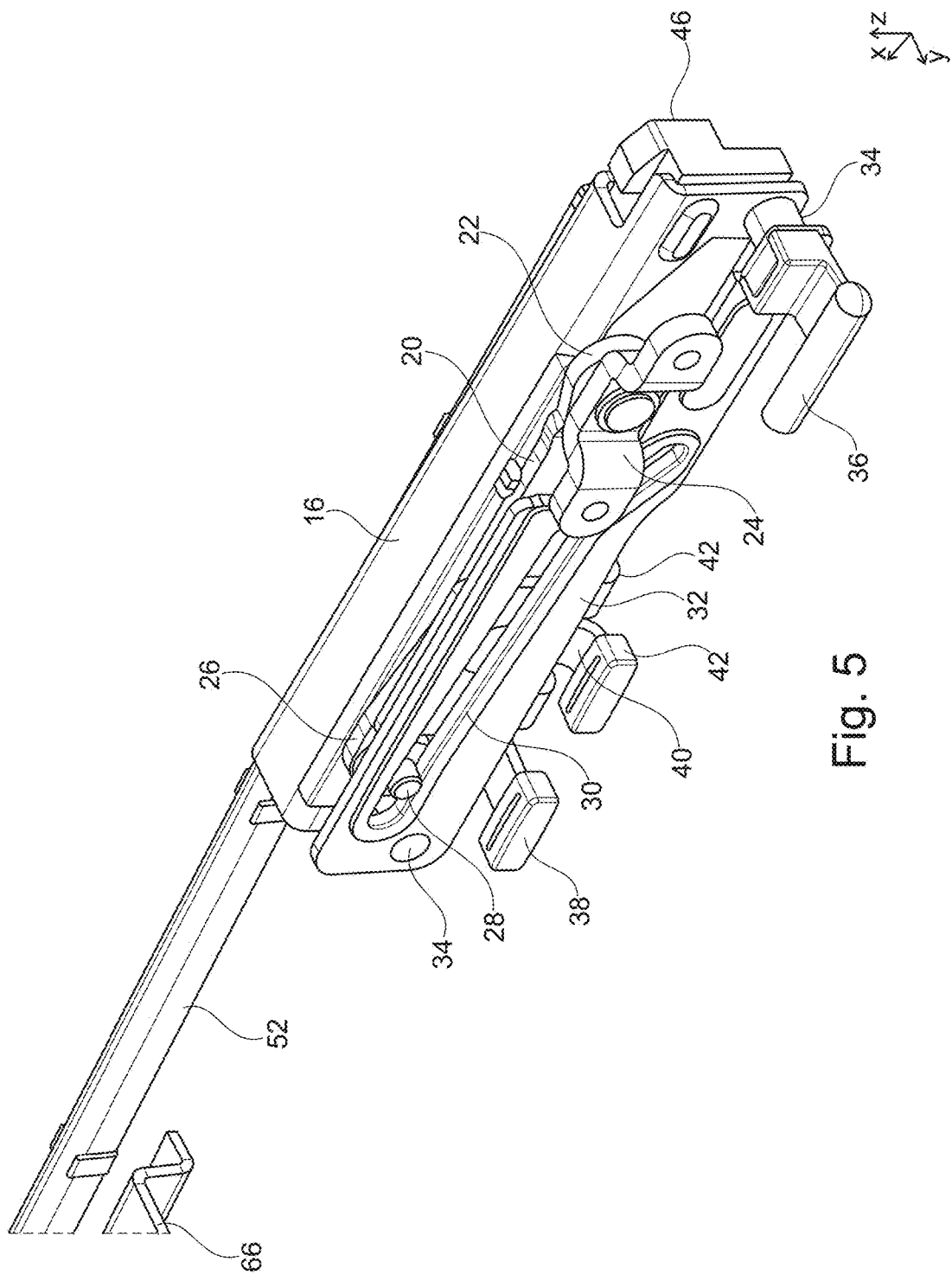
FIG. 5 shows, in a perspective, enlarged view, the lifting mechanism in the closed position.
Figure 6:
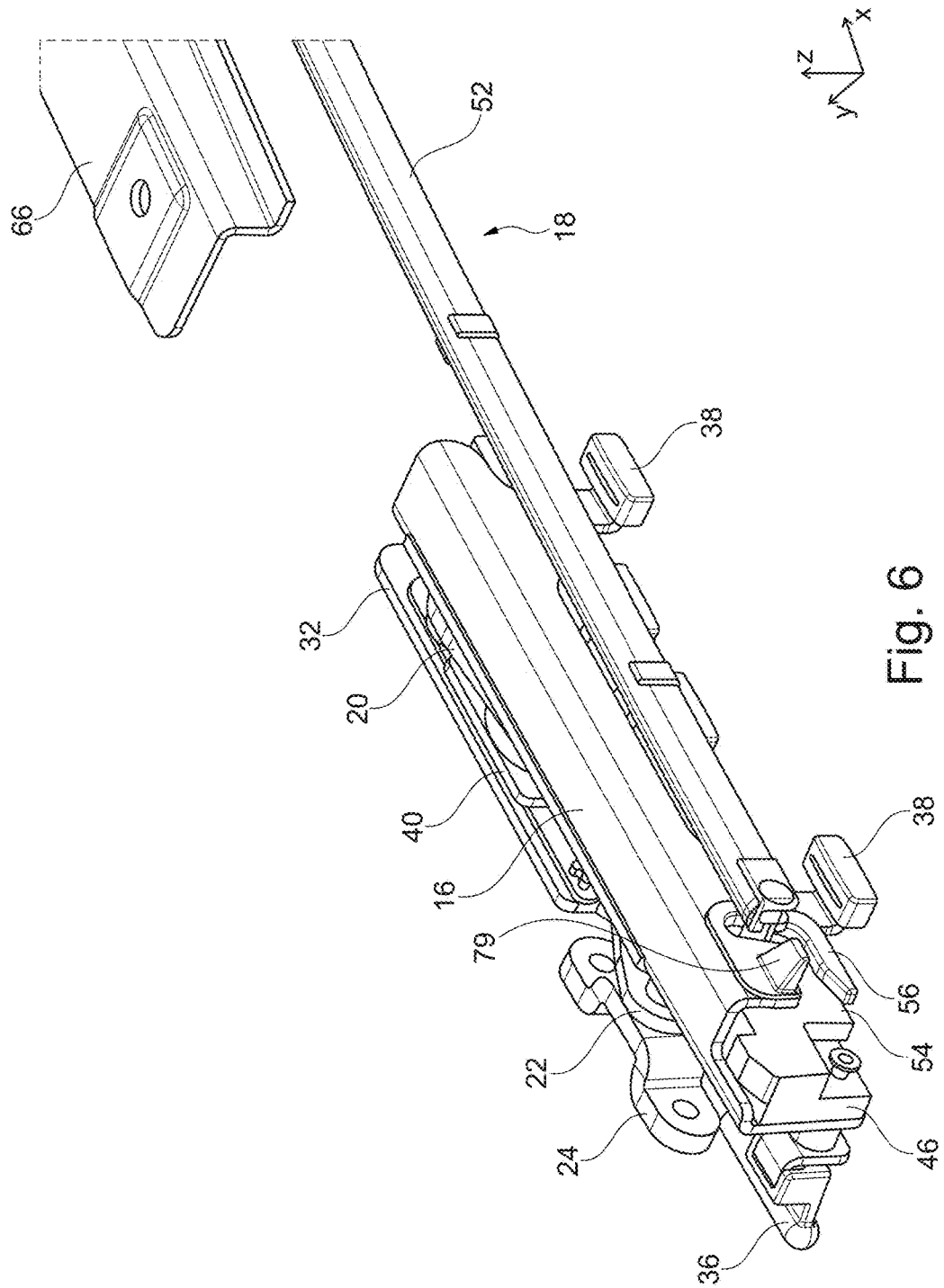
FIG. 6 shows the lifting mechanism of FIG. 5 in a different view, the front half of the transfer mechanism also being visible.

In particular in FIG. 5, an anchoring element 36 can be seen which can be engaged by a drive cable by means of which the carriage 16 can be shifted in the guide rail 10 in the longitudinal direction in a manner known per se.

The carriage 16 includes three sliders 38 by means of which it is received for displacement in the guide rail 10. Two of the sliders 38 are located on one side of the carriage 16 here, and the other slider is located on the opposite side. This configuration reliably prevents an overdetermination from occurring. The carriage 16 is thus mounted so as to run smoothly in the guide rail.

Between its two ends 22, 26, the lifting lever 20 is mounted for swiveling about a swivel axis, which is received in a support part 40 here. The support part is a substantially vertically extending plate having a plurality of support feet 42 by which it is received in the guide rail 10. Here, the support part 40 is received in the guide rail for displacement in the longitudinal direction.

The lifting slot 30 comprises of two substantially straight sections which differ, however, with regard to their inclination in relation to the longitudinal direction. That part of the lifting slot 30 which is located at the rear as related to the vehicle extends slopingly from the rear forward with a small inclination, whereas the front section of the lifting slot slopes downward with a greater inclination.

The distance between the swivel axis by which the lifting lever 20 is mounted in the support part 40 and the front end 22 of the lifting lever here amounts to about twice the distance between the swivel axis and the rear end 26 of the lifting lever (each relating to the swivel axis of the fastening part 24 or the central axis of the pin 28). In this way, a lever transmission is obtained, so that the front end 22 of the lifting lever is shifted by a larger amount (that is, twice the amount here) than the rear end 26 of the lifting lever.

Figure 14:
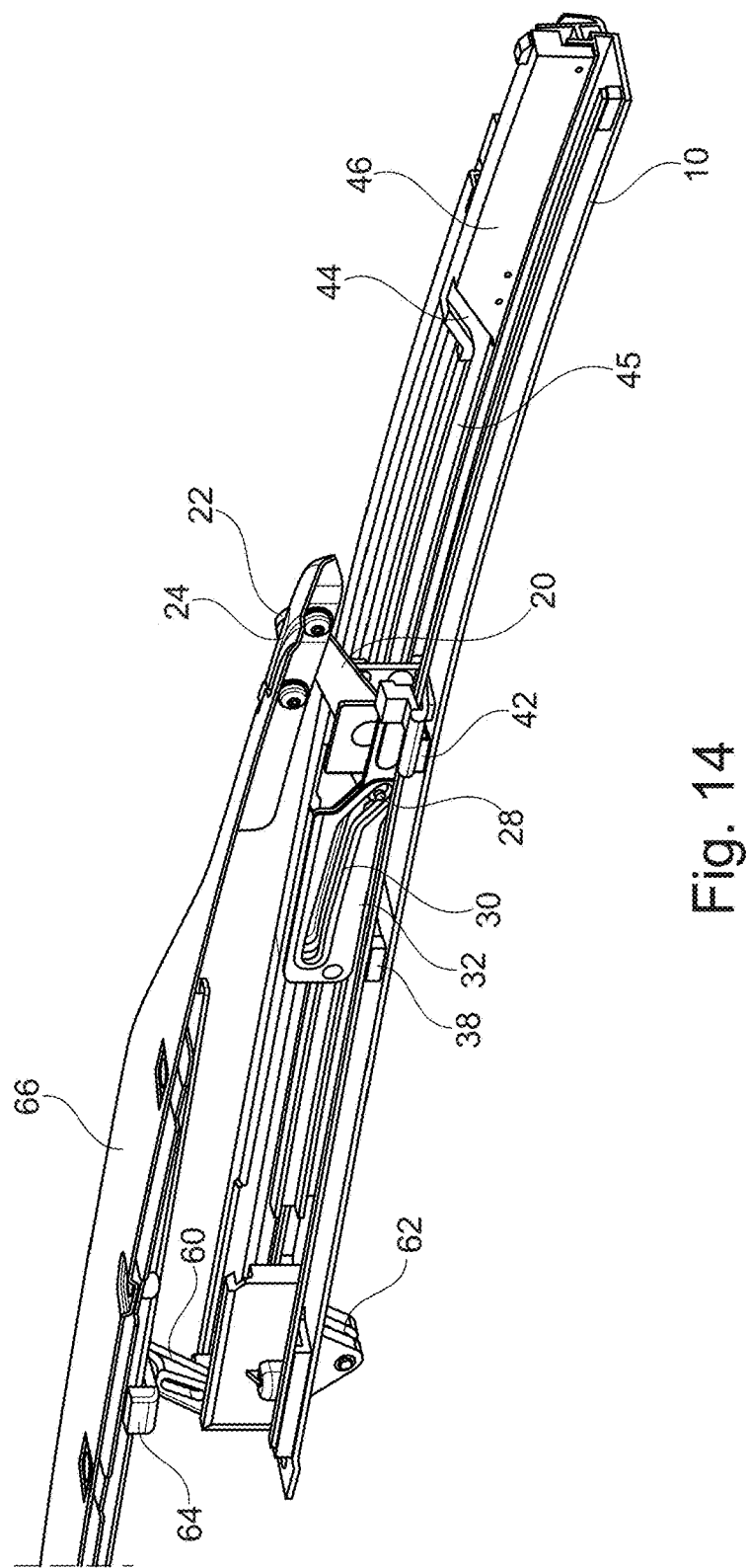
FIG. 14 shows, in a view corresponding to that of FIG. 3, the mechanism with the cover moved rearward.
Figure 15:
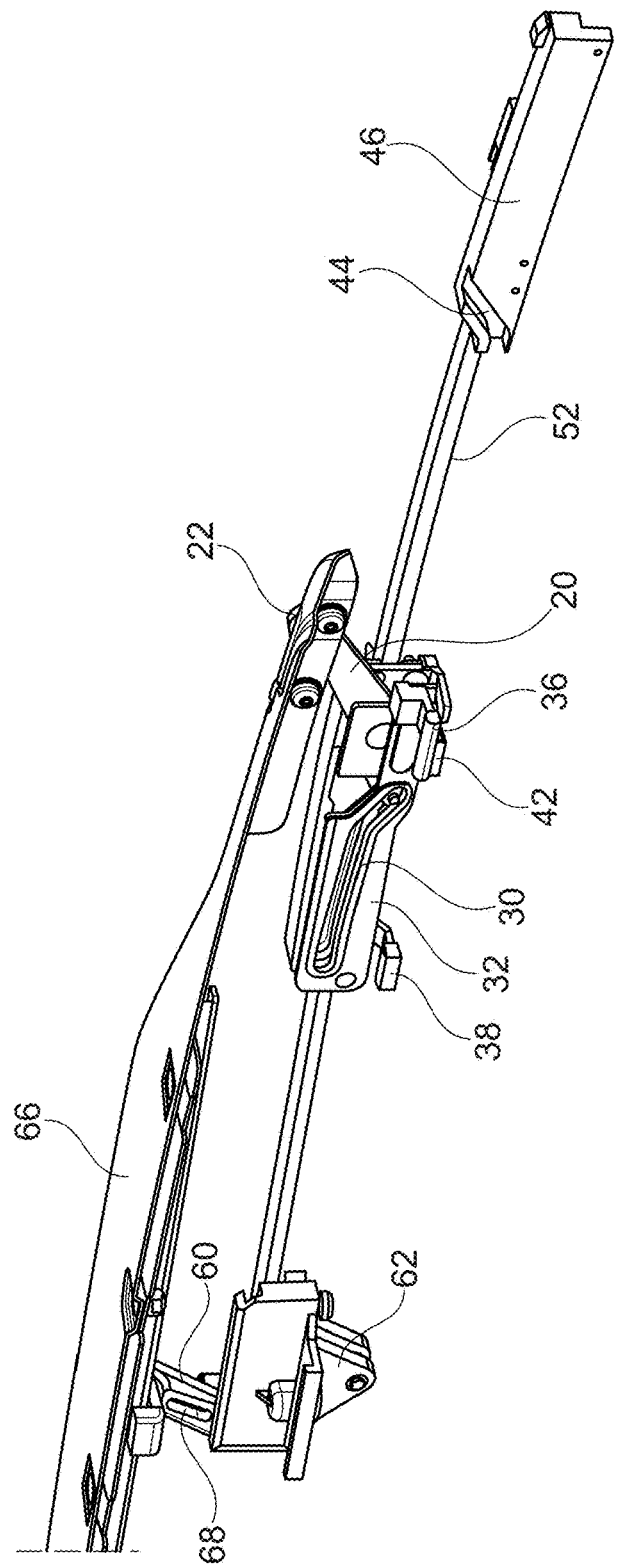
FIG. 15 shows the mechanism in the state of FIG. 14, with the guide rail not being illustrated.

The lifting lever 20 is provided with a control pin which here is formed by a "rear side" extension, as referred to FIG. 5, of the pin 28. This control pin engages into a control slot 44, which can be seen well only as illustrated in FIGS. 14 and 15.

The control pin may also be formed as a part that is separate from the pin 28 and is arranged at a suitable place between the swivel axis of the lifting lever 20 and the rear end 26 of the lifting lever.

The control slot 44 is formed in a plastic part 46 which is inserted in the guide rail 10. The control slot 44 here is open to the rear at its lower, rear end and extends from there obliquely upward and forward as far as to the upper side of the plastic part 46.

The open end of the control slot 44 is adjoined by a guide track 45 which is formed in the guide rail. It extends rearward in the guide rail in a straight line.

Figure 9:
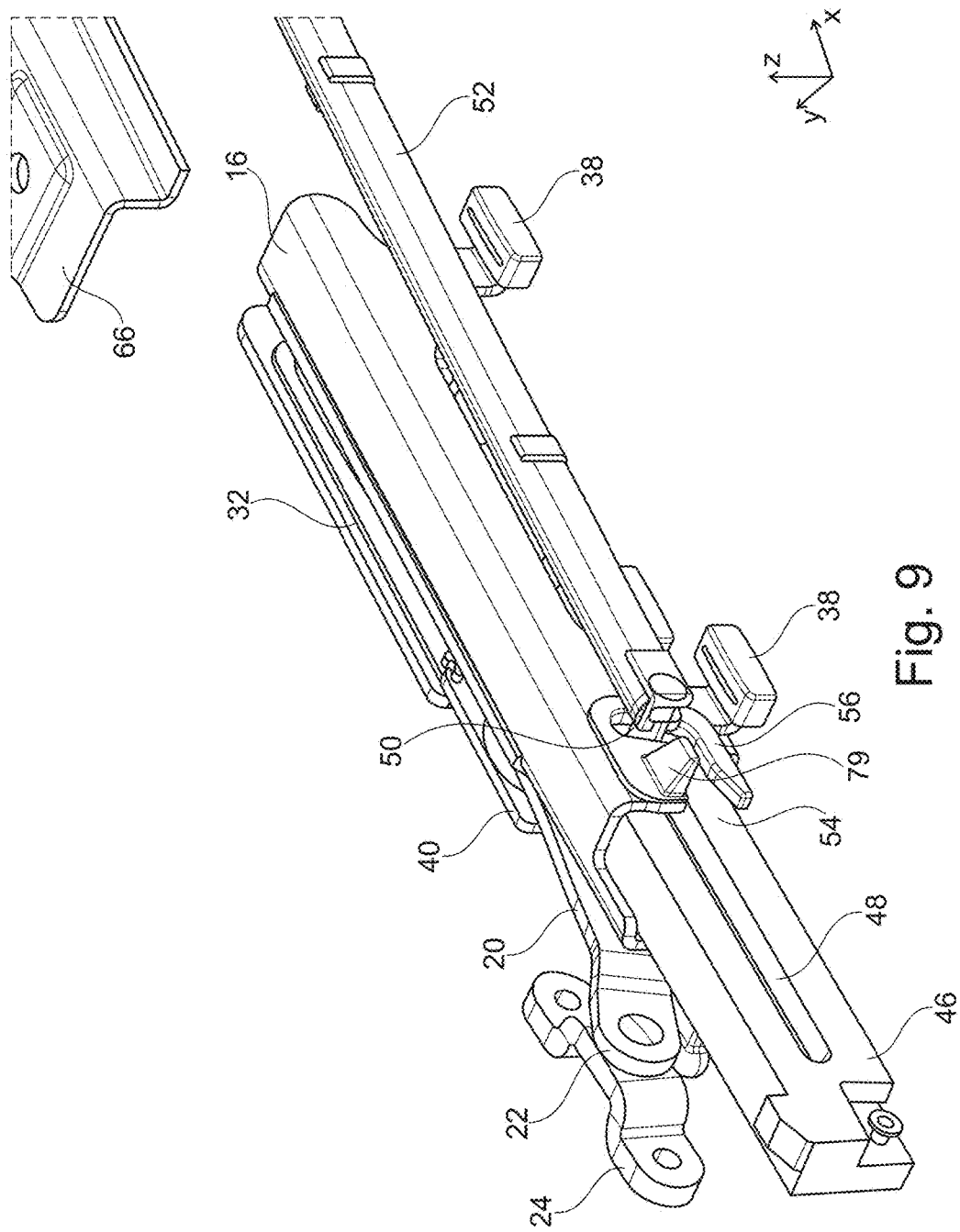
FIG. 9 shows the lifting mechanism in the state of FIG. 8 in a view corresponding to that of FIG. 6.
Figure 12:
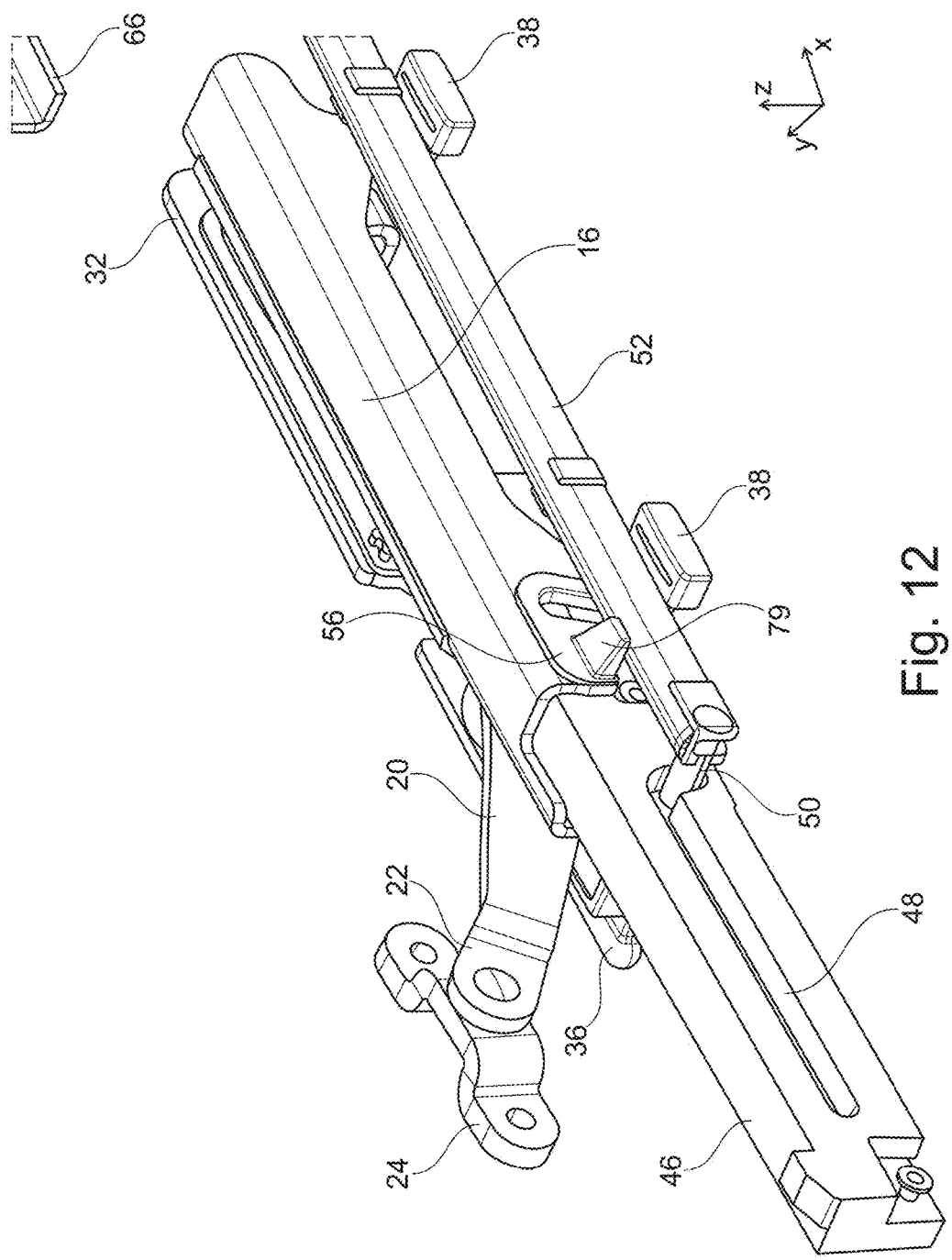
FIG. 12 shows the lifting mechanism in the state of FIG. 11 in an illustration corresponding to that of FIG. 6.
Figure 13:
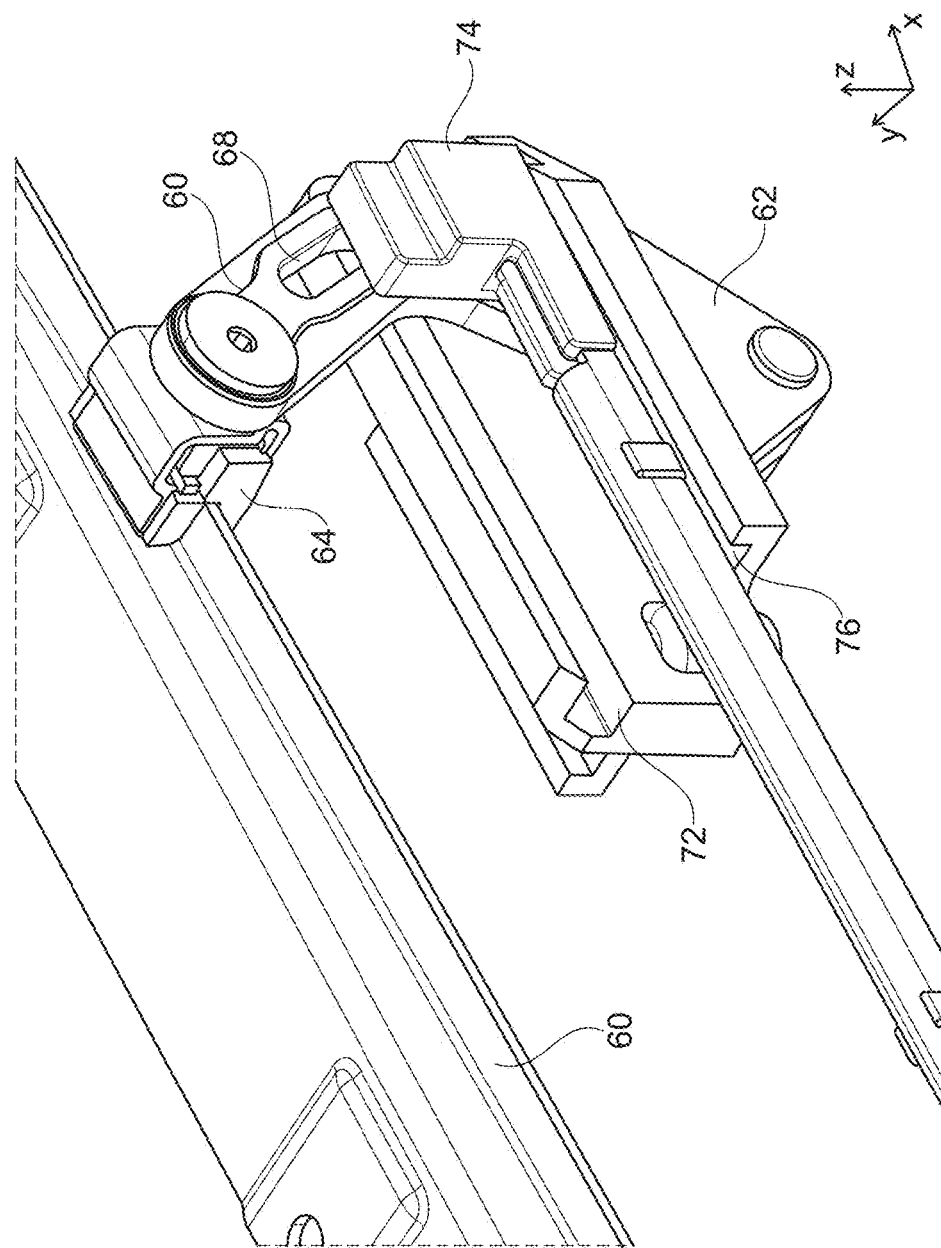
FIG. 13 shows the raising mechanism with the cover raised outward to the maximum.

On the opposite side, which is not visible in FIGS. 14 and 15, the plastic part 46 includes a coupling slot 48, which can be seen best in FIGS. 9 and 12. It extends substantially horizontally from the front by means of a shift section, which is adjoined by a locking section that extends downward.

The coupling slot 48 is engaged by a coupling pin 50 which is attached to the front end of a transfer element 52. The transfer element 52 is the essential part of the transfer mechanism 18.

A put-down slot 54, which is provided at the front end of the carriage 16, may also cooperate with the coupling pin 50. The put-down slot is open at the front side of the carriage 16 and includes first an insertion section which extends substantially horizontally rearward and, adjacent thereto, a lifting section which extends obliquely upward.

The put-down slot 54 is formed in an insert part 56 here, which is attached to the carriage 16 and is made from a plastic material.

The transfer element 52 is in the form of a rod here, the rear end of which serves to control the raising mechanism. The raising mechanism 14 includes, as its essential component, a raising lever 60 one end of which, namely the lower end, is swivel-mounted in a bearing block 62. The bearing block 62 is fitted to the guide rail 10, more specifically at the rear end facing away from the plastic part 46.

Figure 7:
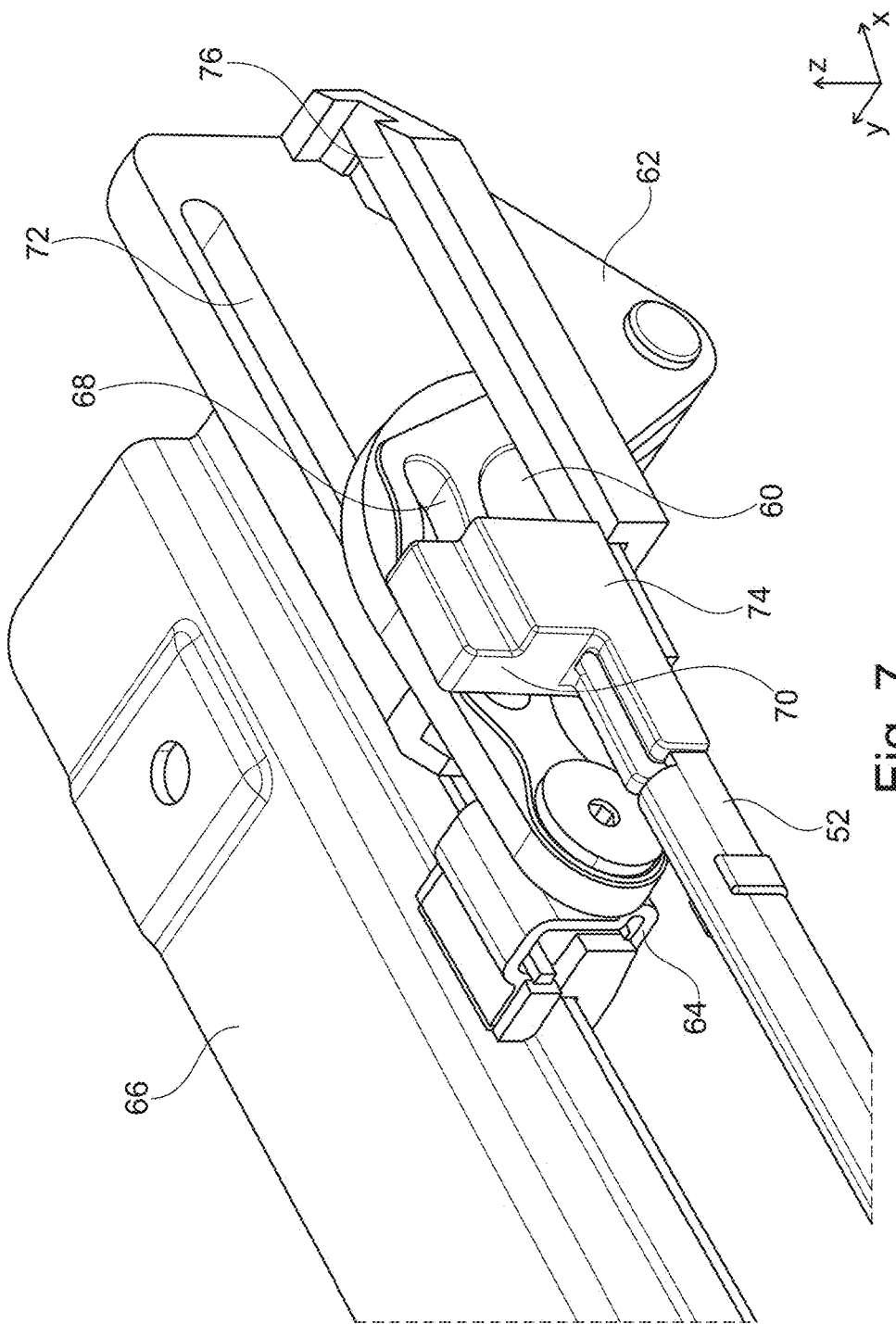
FIG. 7 shows the raising mechanism in the closed position, the rear section of the transfer mechanism also being shown.

The raising lever 60 as a whole has a curved shape, so that in the state shown in FIG. 7, it first extends obliquely upward and forward and then horizontally forward. At its other end, the raising lever 60 is provided with a slide guide 64 in which a cover holder 66 is displaceably received. The cover 5 of the sliding roof system is mounted to the cover holder 66.

In its middle section, the raising lever 60 is provided with a transfer slot 68 into which the transfer element 52 engages by means of an engagement stud 70 indicated in FIG. 7. The engagement stud 70 itself is also received for displacement in a guide 72 in the bearing block 62. The engagement stud 70 is formed on or fitted to an end piece 74 which is mounted to the end of the transfer element 52 and, in turn, is guided in a further guide 76 on the bearing block 62.

When the cover 5 is in its closed position, the carriage 16 is in its position in which it has been shifted forward to the maximum extent. Therefore, the transfer element 52 is also in its position shifted forward to the maximum extent, so that the raising lever 60 has been swiveled forward and the cover holder 66 is in a low position. Any loads in the z-direction are taken up by the guide 72, so that the rear edge of the cover can not be moved outward even in the case of a partial vacuum.

The transfer element 52 is locked in this position since the position of the coupling pin 50 is uniquely defined by the point of intersection of the coupling slot 48 and the put-down slot 54.

The position of the lifting mechanism is determined by the engagement of the control pin 28 into the control slot 44 and the lifting slot 30.

When it is intended to open the roof starting from this position, the carriage 16 is shifted rearward (by means of a drive mechanism that is not illustrated).

The shifting of the carriage 16 is transferred directly to the transfer element 52 since the latter is entrained rearward at its front end by the put-down slot 54; since the coupling slot 48 first extends horizontally, the coupling pin 50 can not yield downward (see FIG. 9).

Figure 10:
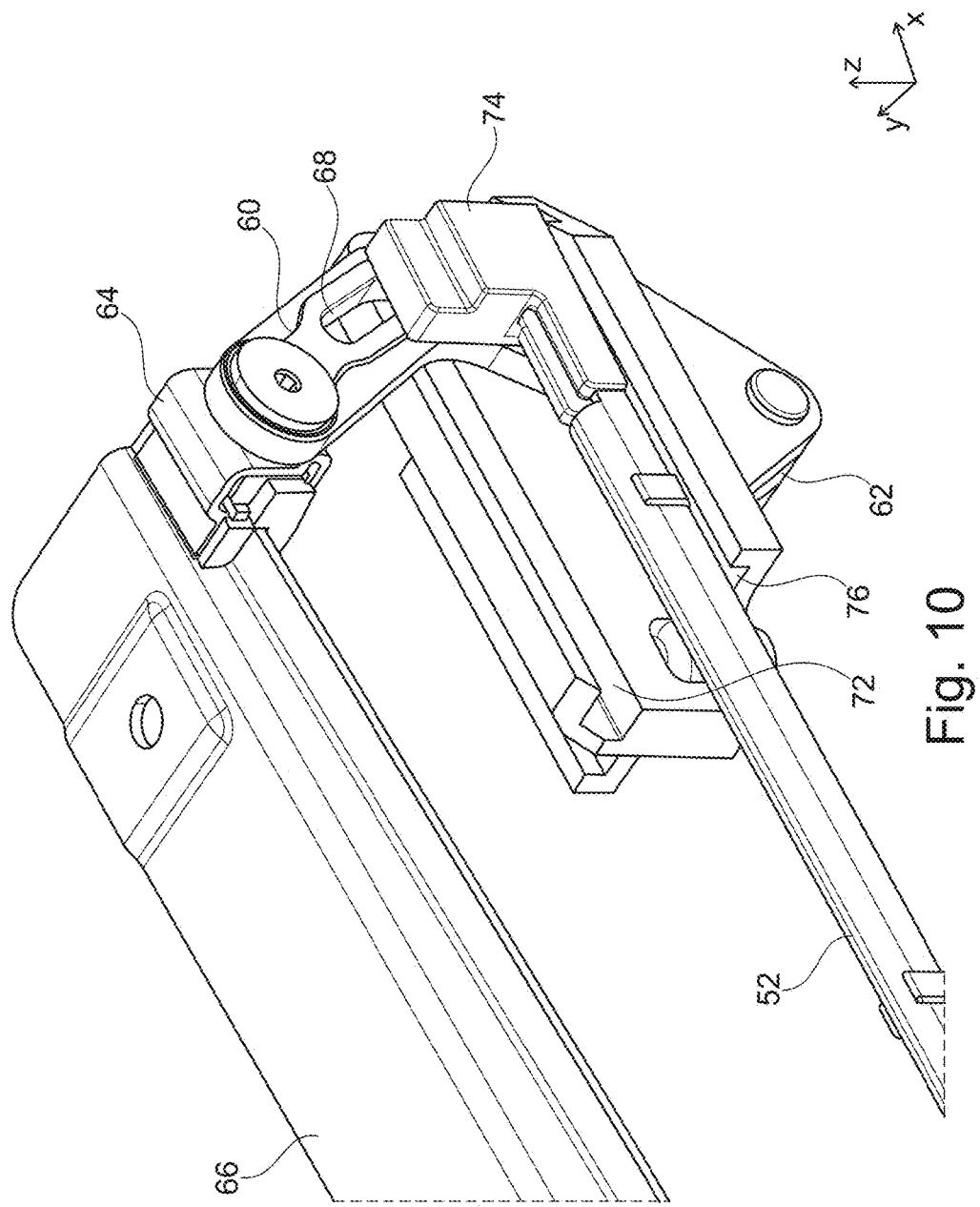
FIG. 10 shows the raising mechanism with the cover partly opened.

The shifting of the transfer element 52 results in the raising lever being raised outward (see the condition shown in FIG. 10).

Figure 8:
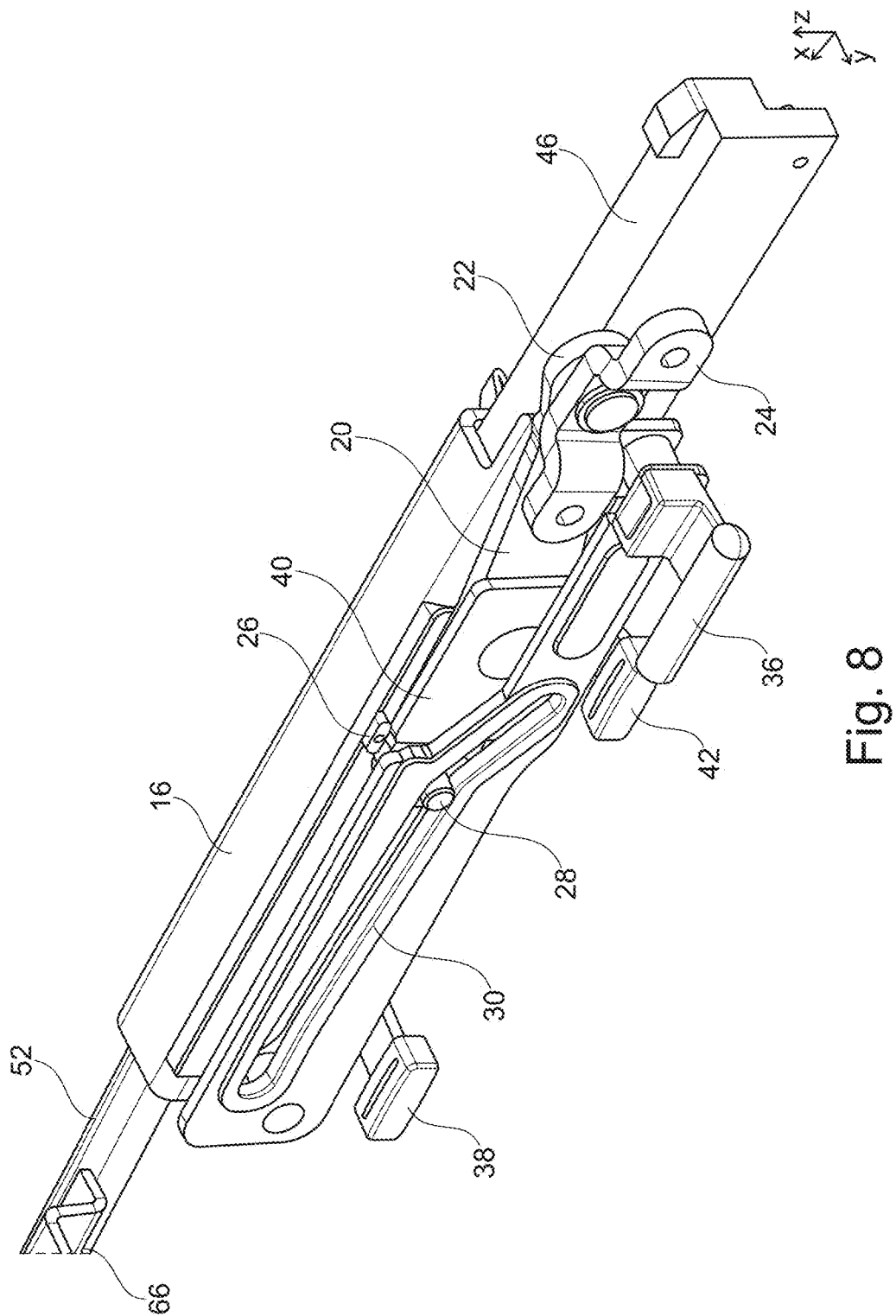
FIG. 8 shows, in a view corresponding to that of FIG. 5, the lifting mechanism with the cover slightly opened.

When the carriage 16 is shifted, the rear end 26 of the lifting lever 20 is slightly moved downward by the engagement of the pin 28 with the lifting slot 30 (see FIG. 8), so that the front end 22 of the lifting lever 20 will accordingly be shifted upward in accordance with the lever transmission ratio. At the same time, the lifting lever 20 is moved slightly rearward since the engagement of the control pin 28 with the control slot 44 causes the vertical movement to be converted into a longitudinal movement.

Once the carriage 16 has been shifted to the rear so far that the raising lever 60 has been shifted outward to the maximum extent, the coupling pin 50 will move into the section of the coupling slot 48 that extends downward (cf. FIGS. 6 and 9), until it finally exits the insertion section of the put-down slot 54 and remains put down at the lower, rear end of the coupling slot 48. In this position, it can be retained by means of a retaining lug 79 which is formed on the insert part 56 and slides on the upper side of the transfer element 52.

The fact that at no point in time is the transfer element 52 separated from the coupling slot 48 is advantageous in view of a low-noise operation of the sliding roof system.

Figure 11:
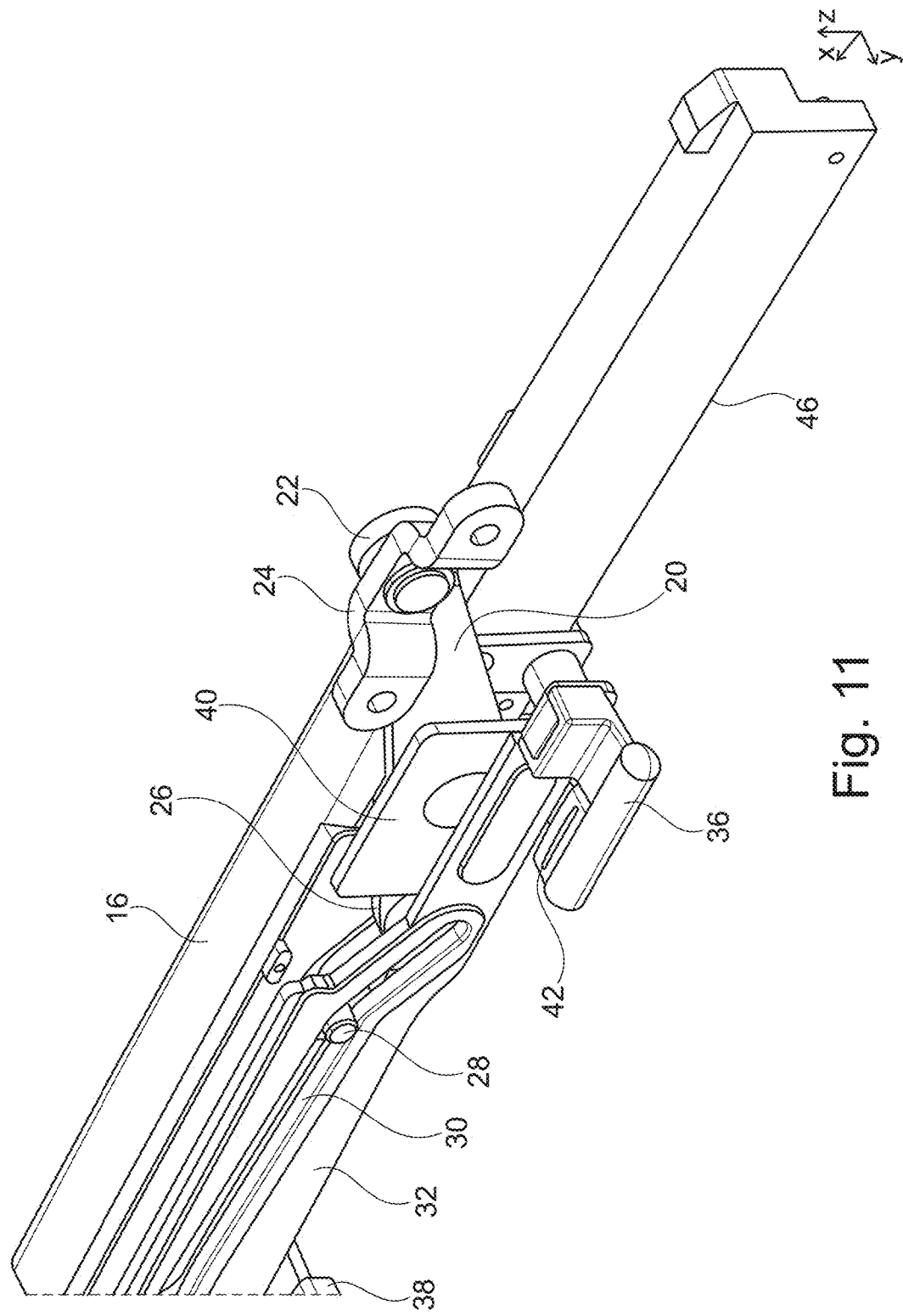
FIG. 11 shows the lifting mechanism in a view corresponding to that of FIG. 5, with the cover being completely raised outward.

The separating of the transfer element 52 from the carriage 16 coincides roughly with the state in which the rear end 26 of the lifting lever 20 reaches the lower, front section of the lifting slot 30 (see FIG. 11). At this point in time, the control pin 28 has been shifted so far downward that it can leave the control slot 44 to the rear.

When the carriage 16 is now shifted further to the rear, it will entrain the lifting lever 20 by the rear end 26 thereof and the engagement into the lifting slot 30 to the rear. In the process, the cover holder 66 slides rearward in the slide guide 64 of the raising lever 60. The state with the cover completely raised outward and shifted to the rear is shown in FIGS. 14 and 15.

In order to close the cover 5 again, the carriage 16 is shifted forward, entraining the lifting lever 20 in its position raised outward. As long as the control pin 28 is in the guide track 45 here, the rear end 26 of the lifting lever 20 can not move upward.

When entering the control slot 44, the lifting lever 20 is slowly swiveled to its lowered position. At the same time, the transfer element 52 is coupled to the carriage 16 again, and the raising lever 60 is swiveled to its initial position again.

Figure 16:
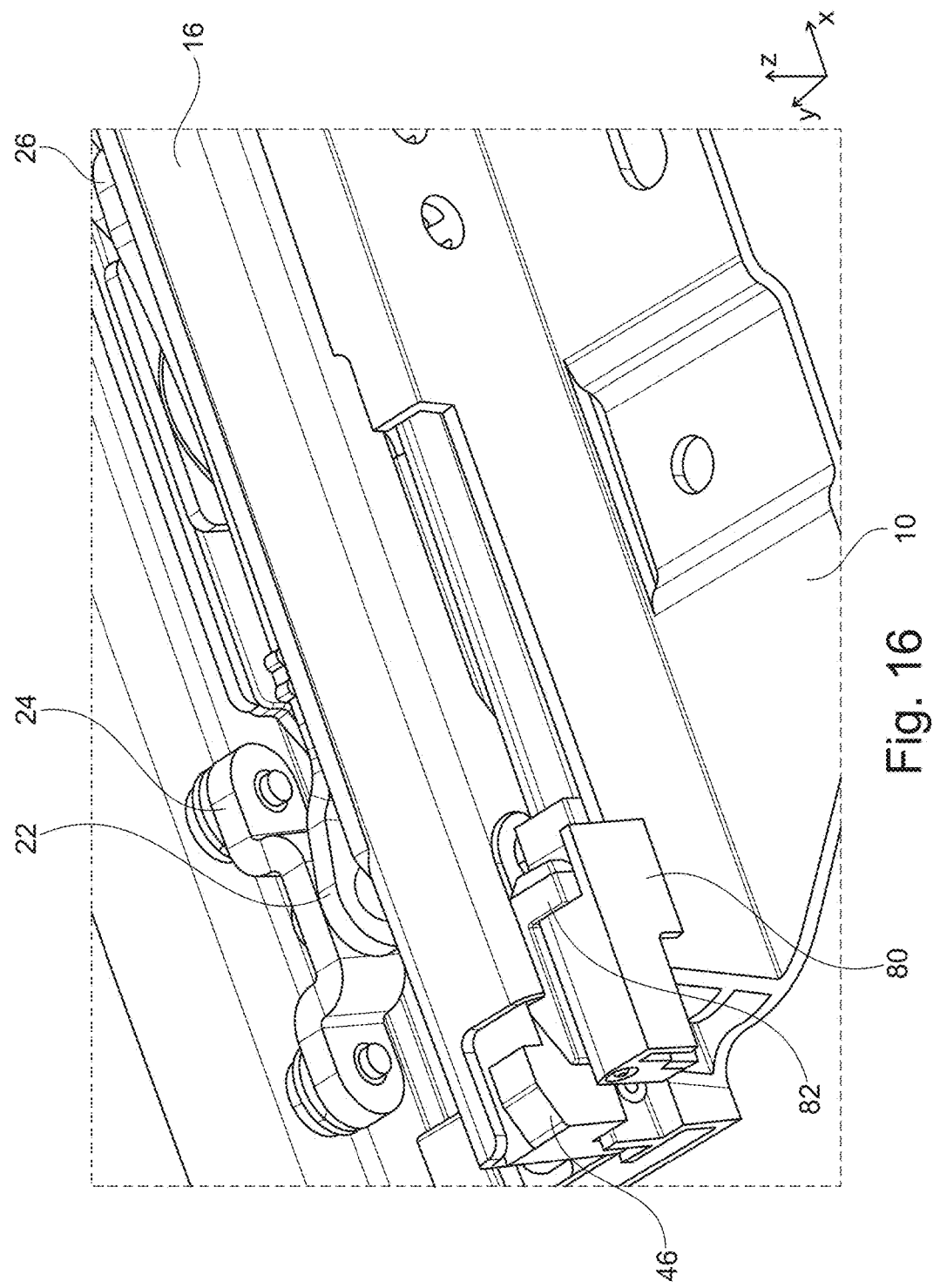
FIG. 16 shows, in a perspective view, the lifting mechanism in the closed state, with a variant configuration for retaining the transfer mechanism being shown.
Figure 17:
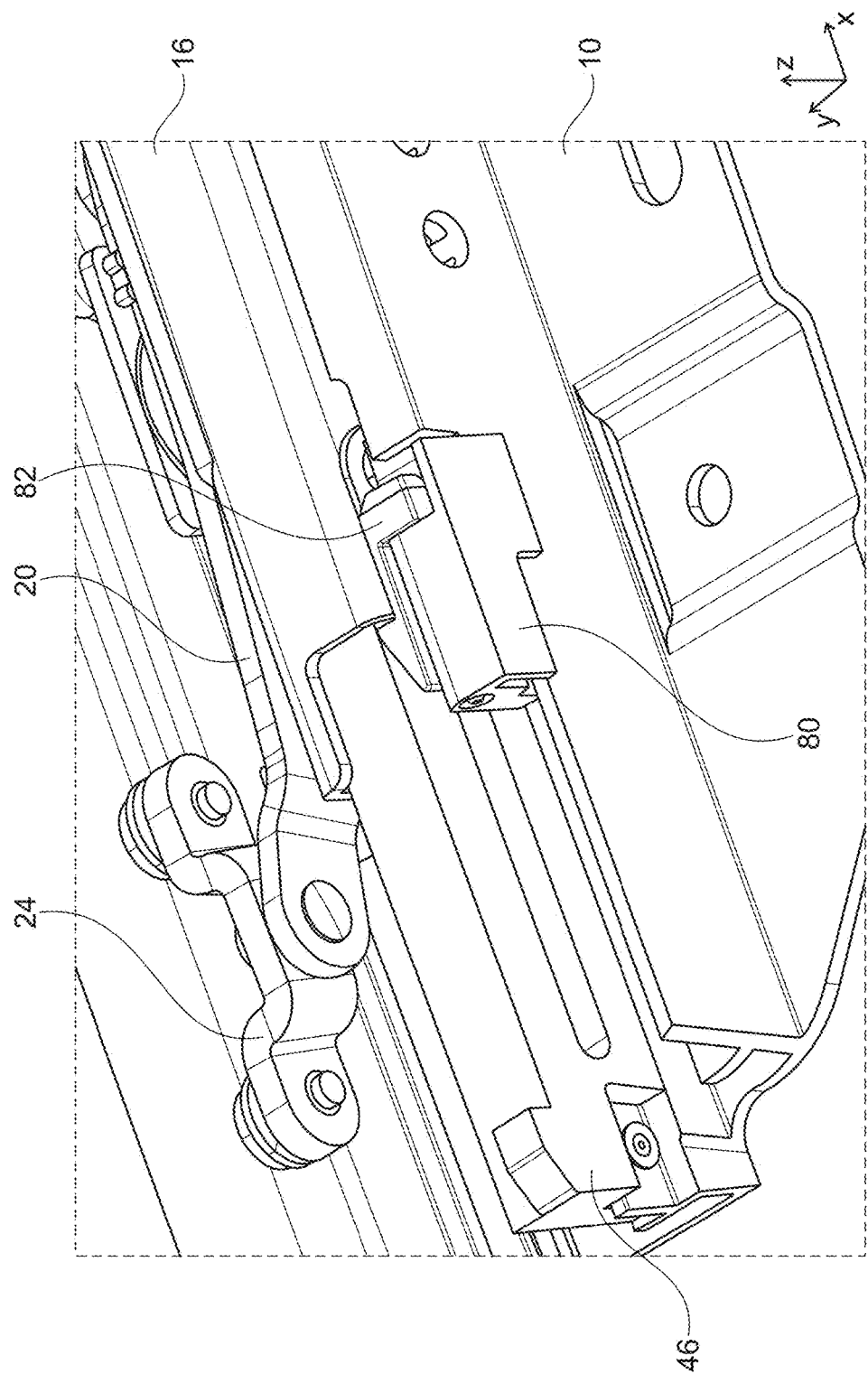
FIG. 17 shows the lifting mechanism of FIG. 16 in a partly open state.
Figure 18:
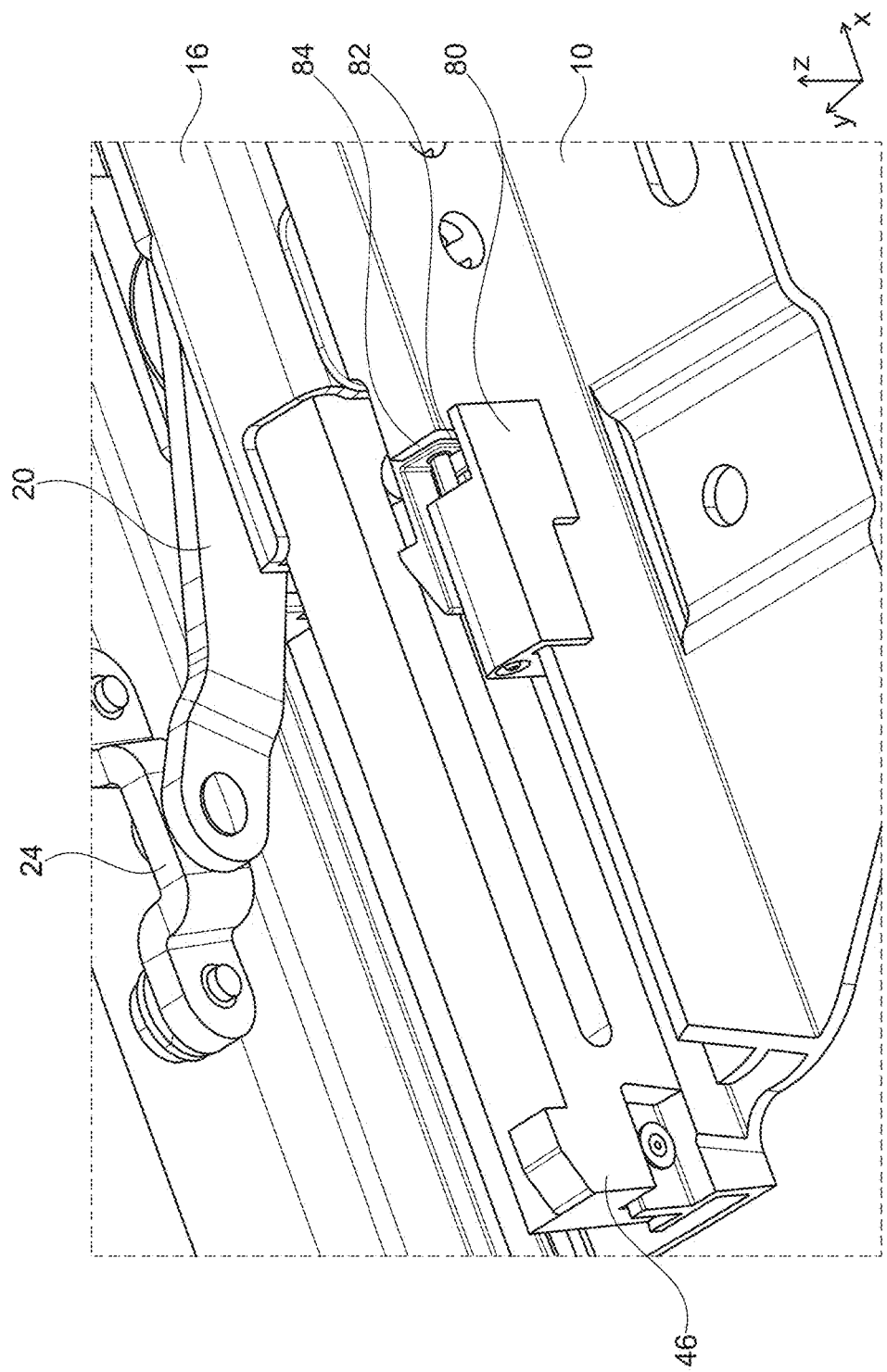
FIG. 18 shows the lifting mechanism of FIG. 16 in a fully open state.

Referring to FIGS. 16 to 18, an alternative to latching the front end of the transfer element 52 in the position in which it is uncoupled from the carriage 16 is discussed. A sliding element 80 is used here, which has a spring-loaded latch 82 associated thereto. When the slide 80 together with the front end of the transfer element 52 is lowered downward, the latch 82 moves to below a contact surface 84 of the guide rail (cf. FIGS. 17 and 18). In this position, the front end of the transfer element is secured in the vertical direction.

When the sliding roof system is closed, the carriage 16 will entrain the latch 82 again, so that the transfer element 52 can be lifted upward.

The invention claimed is:

1. A motor vehicle sliding roof system for shifting a cover from a closed position to an open position, comprising:
    at least one guide rail;
    a carriage that is displaceable in the guide rail;
    a lifting mechanism that controls a displacement of the front edge of the cover;
    a raising mechanism that controls a displacement of the rear edge of the cover, the raising mechanism having a raising lever that is swivel-mounted to a bearing block; and
    a transfer mechanism adapted to transfer a displacement of the carriage to the raising mechanism, the lifting mechanism, the raising mechanism and the transfer mechanism having a modular structure, wherein the bearing block includes a guide for a transfer element of the transfer mechanism.

2. The sliding roof system of claim 1, wherein the carriage is coupled to the lifting mechanism.

3. The sliding roof system of claim 1, wherein the lifting mechanism extends exclusively above the lower edge of the guide rail.

4. The sliding roof system of claim 1, wherein a free end of the raising lever is provided with a slide guide for a cover holder.

5. A motor vehicle sliding roof system for shifting a cover from a closed position to an open position, comprising:
    at least one guide rail;
    a carriage that is displaceable in the guide rail;
    a lifting mechanism that controls a displacement of the front edge of the cover, the lifting mechanism having a lifting lever having one end cooperating with the carriage and the other end of which is associated with the cover, and wherein and the lifting lever is mounted to swivel about a swivel axis which is arranged between its two ends, wherein the distance of the end of the lifting lever cooperating with the carriage from the swivel axis is on the order of from 20% to 60% of the distance between the swivel axis of the lifting lever and a connecting point of the cover;
    a raising mechanism that controls a displacement of the rear edge of the cover; and
    a transfer mechanism adapted to transfer a displacement of the carriage to the raising mechanism, the lifting mechanism, the raising mechanism and the transfer mechanism having a modular structure.

6. The sliding roof system of claim 5, wherein the swivel axis is associated with a support part which is arranged for displacement in the guide rail.

7. The sliding roof system of claim 5, wherein the lifting lever is provided with a control pin which cooperates with a control slot arranged in the guide rail.

8. The sliding roof system of claim 7, wherein the control slot, as viewed from the front to the rear, includes a section sloping downward and, adjacent thereto, a section open to the rear, which is adjoined by a guide track extending in a straight line along the guide rail.

9. The sliding roof system of claim 7, wherein the carriage includes a put-down slot, which is open at the front side of the carriage and wherein a coupling slot and the control slot are formed in a plastic part which is inserted in the guide rail.

10. A motor vehicle sliding roof system for shifting a cover from a closed position to an open position, comprising:
- at least one guide rail;
- a carriage that is displaceable in the guide rail;
- a lifting mechanism that controls a displacement of the front edge of the cover;
- a raising mechanism that controls a displacement of the rear edge of the cover, the raising mechanism having a raising lever that is swivel-mounted to a bearing block; and
- a transfer mechanism adapted to transfer a displacement of the carriage to the raising mechanism, the lifting mechanism, the raising mechanism and the transfer mechanism having a modular structure, wherein in its middle portion the raising lever is provided with a transfer slot into which a transfer element of the transfer mechanism engages.

11. The sliding roof system of claim 10, wherein the transfer slot runs in a curved shape.

12. A motor vehicle sliding roof system for shifting a cover from a closed position to an open position, comprising:
- at least one guide rail;
- a carriage that is displaceable in the guide rail;
- a lifting mechanism that controls a displacement of the front edge of the cover;
- a raising mechanism that controls a displacement of the rear edge of the cover, the raising mechanism having a raising lever that is swivel-mounted to a bearing block; and
- a transfer mechanism adapted to transfer a displacement of the carriage to the raising mechanism, the lifting mechanism, the raising mechanism and the transfer mechanism having a modular structure, wherein a swivel axis by means of which the raising lever is connected with the bearing block is arranged below a lower edge of the guide rail.

13. A motor vehicle sliding roof system for shifting a cover from a closed position to an open position, comprising:
- at least one guide rail;
- a carriage that is displaceable in the guide rail;
- a lifting mechanism that controls a displacement of the front edge of the cover;
- a raising mechanism that controls a displacement of the rear edge of the cover; and
- a transfer rod adapted to transfer a displacement of the carriage to the raising mechanism, the lifting mechanism, the raising mechanism and the transfer rod having a modular structure, wherein the carriage includes a retaining lug that engages an upper side of the transfer rod when the transfer rod is uncoupled from the carriage.

14. The sliding roof system of claim 13, wherein the transfer rod is releasably coupled to the carriage.

15. The sliding roof system of claim 13, wherein the guide rail has a coupling slot arranged therein, into which the transfer rod engages.

16. The sliding roof system of claim 15, wherein the coupling slot includes a shift section extending in a straight line from the front to the rear and, adjacent thereto, a locking section extending downward.

17. A motor vehicle sliding roof system for shifting a cover from a closed position to an open position, comprising:
- at least one guide rail;
- a carriage that is displaceable in the guide rail;
- a lifting mechanism that controls a displacement of the front edge of the cover;
- a raising mechanism that controls a displacement of the rear edge of the cover;
- a transfer rod adapted to transfer a displacement of the carriage to the raising mechanism, the lifting mechanism, the raising mechanism and the transfer rod having a modular structure; and
- a sliding element that retains an end of the transfer rod associated with the carriage when the end of the transfer rod is uncoupled from the carriage.

18. The sliding roof system of claim 17, wherein the transfer rod is releasably coupled to the carriage.

19. A motor vehicle sliding roof system for shifting a cover from a closed position to an open position, comprising:
- at least one guide rail;
- a carriage that is displaceable in the guide rail, wherein the carriage includes a put-down slot, which is open at the front side of the carriage;
- a lifting mechanism that controls a displacement of the front edge of the cover;
- a raising mechanism that controls a displacement of the rear edge of the cover; and
- a transfer mechanism adapted to transfer a displacement of the carriage to the raising mechanism, the lifting mechanism, the raising mechanism and the transfer mechanism having a modular structure.

20. The sliding roof system of claim 19, wherein the put-down slot includes an insertion section extending rearward at the bottom and, adjacent thereto, a lifting section extending upward.

21. The sliding roof system of claim 19, wherein the guide rail has a coupling slot arranged therein, into which the transfer mechanism engages.

22. The sliding roof system of claim 21, wherein the coupling slot includes a shift section extending in a straight line from the front to the rear and, adjacent thereto, a locking section extending downward.

* * * * *